United States Patent [19]

Ford

[11] Patent Number: 5,042,731
[45] Date of Patent: Aug. 27, 1991

[54] GRINDER DISCHARGE CHUTE

[75] Inventor: David F. Ford, Springfield, Ill.

[73] Assignee: Bunn-O-Matic Corporation, Springfield, Ill.

[21] Appl. No.: 530,892

[22] Filed: May 30, 1990

[51] Int. Cl.$^5$ ............................................... A47J 42/40
[52] U.S. Cl. ................................. 241/100; 193/32
[58] Field of Search ..................... 99/289 R, 286, 287; 10/165; 241/100, 36, 34; 193/2 R, 4, 34, 32

[56] References Cited

U.S. PATENT DOCUMENTS

| | | | |
|---|---|---|---|
| 2,309,246 | 1/1943 | Henry | 241/100 X |
| 2,900,140 | 8/1959 | Schuhmann et al. | 241/100 X |
| 3,021,984 | 2/1962 | Engi | 241/100 X |
| 4,714,206 | 12/1987 | Nidiffer et al. | |
| 4,813,622 | 3/1989 | Nidiffer et al. | |
| 4,970,948 | 11/1990 | Giannelli | 99/286 X |

*Primary Examiner*—Mark Rosenbaum
*Attorney, Agent, or Firm*—Trexler, Bushnell, Giangiorgi & Blackstone, Ltd.

[57] ABSTRACT

A coffee grinder discharge chute for use with a coffee grinder operatively attached to a discharge opening in the grinder. The chute is comprised of a generally vertical elongate channel-shaped body having a generally tubular upper section and a channel-shaped lower portion. A grind directing cover is hingedly attached to the chute body over the channel-shaped lower portion to adjustably enclose the flow of ground coffee discharged through the chute thereby shielding the discharged ground coffee from ambient air currents. An end of the chute has sides which are cut back to provide increased grind flow therethrough and an inwardly directed end portion against which the coffee exerts a force to open the hingedly attached cover member. A chaff suppressing grinder discharge cleaning baffle is attached generally in the upper portion of the chute body. The baffle includes a plate member to which is attached a plunger and a clean-out lever. The plunger extends into the discharge opening of the grinder to remove ground coffee which cakes therein and to knock loose any coffee accumulations. The plunger is automatically moved through the discharged opening by attachment to the plate member which is biasedly moved by a prespecified amount of ground coffee. The clean-out lever provides manual movement of the plate member and attached plunger.

15 Claims, 2 Drawing Sheets

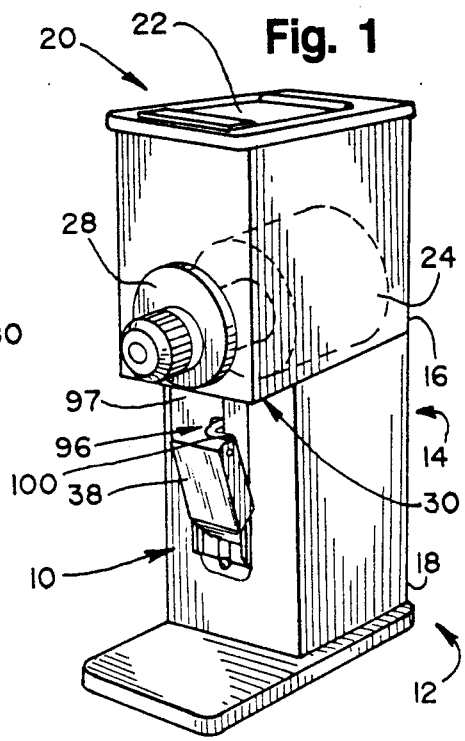
Fig. 1
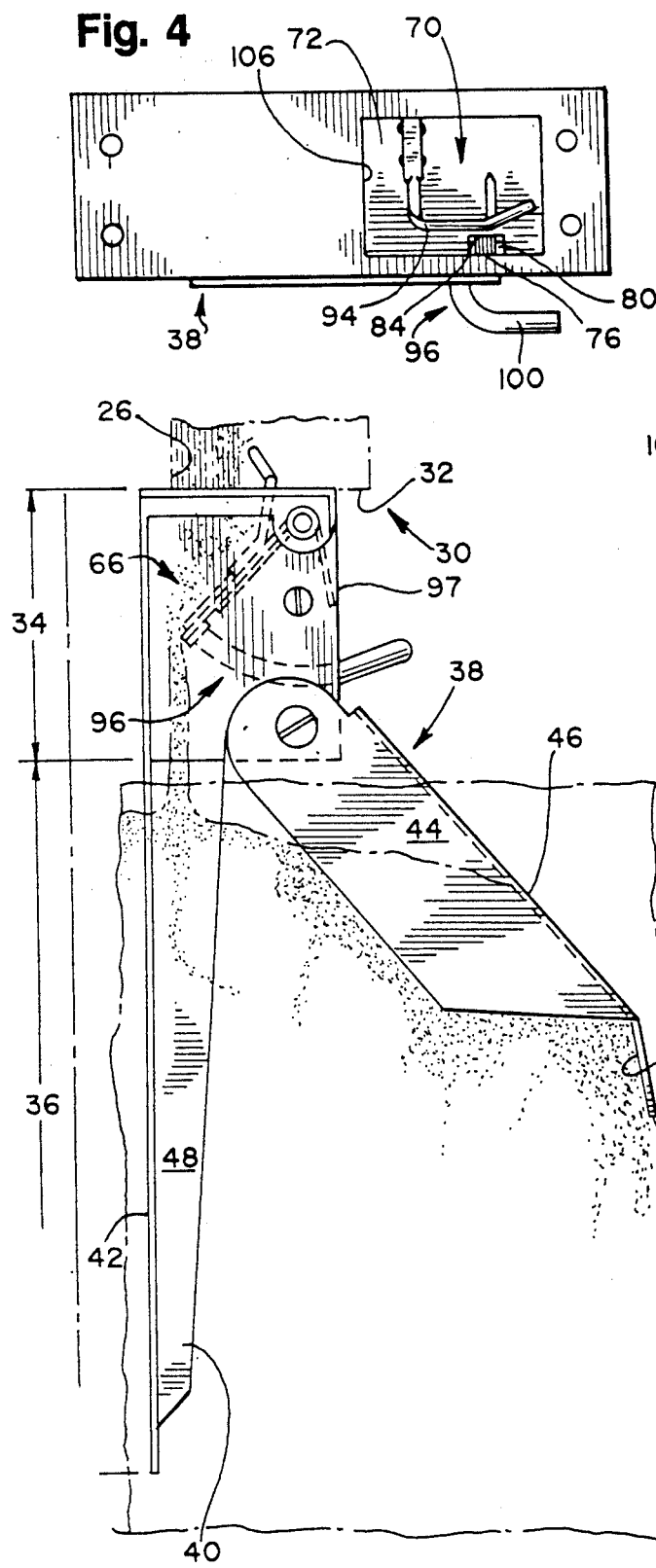
Fig. 4
Fig. 5

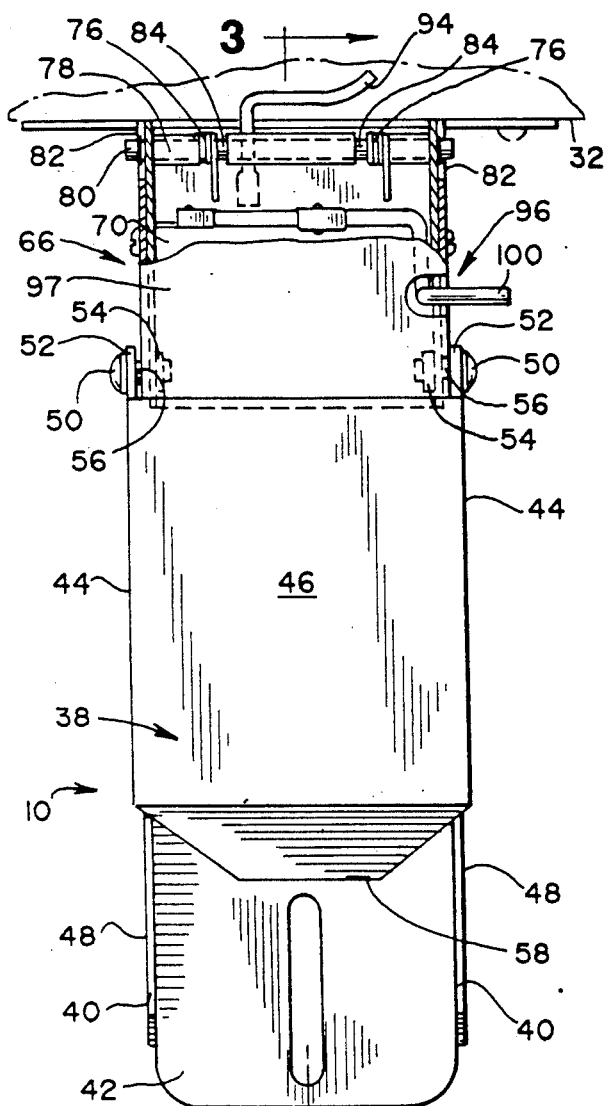
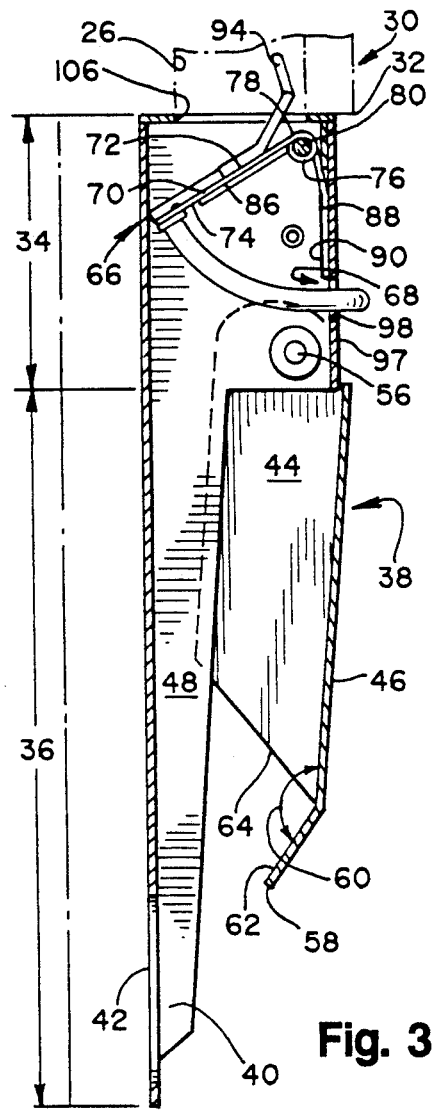
Fig. 2
Fig. 3
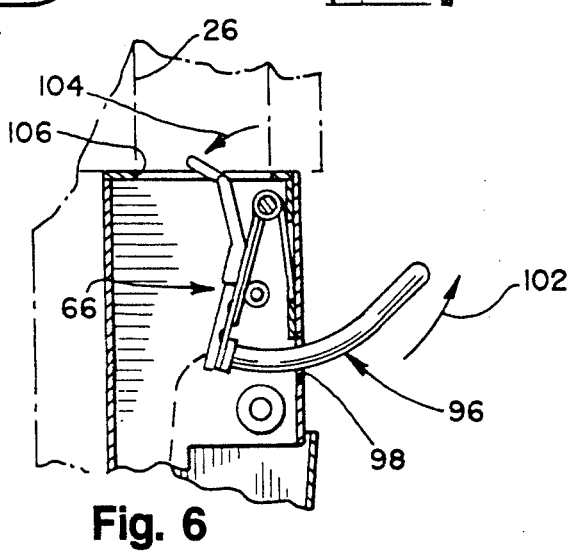
Fig. 6

GRINDER DISCHARGE CHUTE

BACKGROUND OF THE INVENTION

This invention relates to a discharge chute for a material grinding apparatus and more particularly to a discharge chute for a coffee grinder.

The popularity of and the demand for freshly ground coffee has grown substantially and continues to grow. Many retail establishments, such as supermarkets, restaurants and specialty shops, have coffee grinders for roasted coffee beans providing freshly ground coffee on demand. Freshly ground coffee provides recognizably preferable characteristics over preground coffee.

Many types of coffee beans have a thin membrane which dries during the roasting process. Upon grinding of the coffee beans, the thin membrane is separated from the rest of the coffee bean creating a light bean debris which separates therefrom during grinding. The dried, ground membrane is commonly called chaff. Chaff does not detract from the flavor of coffee, however, due to its light weight, it is prone to being separated from the ground coffee discharged from the grinder to a container waiting therebelow. Free floating chaff can create problems within the grinder and therefore it is desirable to retain the chaff within the bulk of the ground coffee. Further, it is desirable to retain chaff in the coffee in order to help reduce caking problems which typically occurs in ground coffee as it is discharged from the grinder.

Prior art devices have attempted to combat chaff problems by keeping the chaff mixed with the coffee as it is discharged from the coffee grinder. One example of a prior art device which attempts to conquer chaff problems is shown in U.S. Pat. No. 4,813,622 to Nidiffer et al. As shown in Nidiffer et al., a flat steel spring covers a discharge opening from the grinder to a discharge chute. The flat steel spring packs the coffee to some degree as it exits the discharge opening prior to entering the discharge chute. The spring creates a buffer preventing air currents from separating the chaff and creates a more continuous stream of ground coffee discharged therefrom.

While the device as shown in Nidiffer et al. is generally satisfactory, a remaining problem exists in that an amount of ground coffee is retained above the flat steel spring after grinding. This amount of coffee mixes with the next grind of beans creating an undesirable mixture of beans should the two sequential grinds be of dissimilar bean type. An example of the undesirability of this problem is especially prominent when a dark roasted coffee bean is finely ground and is followed by a grind of a coarse grind of a lightly roasted bean. In such a scenario, the dark roasted bean, unintentionally mixed in with the light bean, is quite prominently pronounced and when the light bean is brewed, may create an undesirable taste.

Further, prior art devices attempting to resolve the chaff separation problem tended to be ineffective for extra fine grinds such as expresso or Turkish grinds. With an expresso or Turkish grind, the coffee tends to pack together and thus force the chaff mixing spring into its open position. Due to the arrangement of a clean-out plunger as mentioned below, the blockage typically could not be removed requiring disassembly of the mechanism upon this occurrence.

Additionally, the prior art as shown in the device in Nidiffer et al. provides a baffling arrangement which deposits the coffee into a channel-shaped section of the discharge chute whereupon the discharged coffee may be exposed to air currents caught within the chute. The air currents caught within the channel-shaped portion of the discharge chute tend to separate the chaff thereby defeating the initial purpose of the flat steel spring as mentioned above.

In an attempt to resolve the problem of retaining coffee above the flat steel spring, a chaff plunger was added a baffle to which a lever was attached. Movement of the lever moved the plunger through the discharge opening in the grinder. Such movement of the plunger dislodged caked ground coffee packed within the chamber and tended to remove some of the coffee accumulated above the flat steel spring. However, due to the configuration of the plunger and flat steel spring, an amount of coffee still remained above the flat steel spring and would inevitably be mixed with the next grind of beans.

OBJECTS AND SUMMARY OF THE INVENTION

A general object of the present invention is to provide a coffee grinder discharge chute which provides chaff control and is not affected by the type of grind which passes therethrough.

Another object of the present invention is to provide a coffee discharge chute which provides a clean-out mechanism to prevent coffee which accumulates from a previous grind from mixing with a subsequent grind.

Yet a further object of the present invention is to provide a coffee discharge chute which provides adjustable coverage of the discharge flow therefrom on all sides thus preventing chaff separation from the ground coffee due to ambient air currents around the discharge chute.

Briefly, and in accordance with the foregoing, the present invention comprises a coffee grinder discharge chute for use with a coffee grinder or the like operatively attached to a discharge opening in the grinder. The chute is comprised of a generally vertical elongate channel-shaped body having a generally tubular upper section and a channel-shaped lower portion. A grind directing cover is hingedly attached to the chute body over the channel-shaped lower portion to adjustably enclose the flow of ground coffee discharged through the chute thereby shielding the discharged ground coffee from ambient air currents. An end of the chute has sides which are cut back to provide increased grind flow therethrough and an inwardly directed end portion against which the coffee exerts a force to open the hingedly attached cover member. A chaff suppressing grinder discharge cleaning baffle is attached generally in the upper portion of the chute body. The baffle includes a plate member to which is attached a plunger and a clean-out lever. The plunger extends into the discharge opening of the grinder to remove ground coffee which cakes therein and to knock loose any coffee accumulations. The plunger is automatically moved through the discharged opening by attachment to the plate member which is biasedly moved by a prespecified amount of ground coffee. The clean-out lever provides manual movement of the plate member and attached plunger.

BRIEF DESCRIPTION OF THE DRAWINGS

The features of the present invention which are believed to be novel are set forth with particularity in the appended claims. The organization and manner of the operation of the invention together with the further objects and advantages thereof, may best be understood by reference to the following description taken in connection with the accompanying drawings wherein like reference numerals identify like elements in which:

FIG. 1 is a perspective view of a coffee grinder discharge chute attached to an underside of an overhanging portion of a coffee grinding apparatus;

FIG. 2 is an enlarged partial sectional front view of the discharge chute as attached to the coffee grinder as illustrated in FIG. 1;

FIG. 3 is a cross-sectional side view of the discharge chute as illustrated in FIG. 2 taken along line 3—3 illustrating the chaff suppressing grinder discharge cleaning baffle;

FIG. 4 is a top view of the discharge chute;

FIG. 5 is a side elevational view of the discharge chute in operation having a coffee ground receiving container positioned therebeneath to receive grounds discharged from the coffee grinder through the discharge chute; and FIG. 6 is an enlarged cross-sectional view of the chaff suppressing grinder discharge cleaning baffle in the maximum open position to remove any ground coffee accumulations from the discharge opening, the plate member as well as the plunger.

DETAILED DESCRIPTION OF THE ILLUSTRATED EMBODIMENT

While this invention may be susceptible to embodiment in different forms, there is shown in the drawings and will be herein described in detail, a specific embodiment with the understanding that the present disclosure is to be considered an exemplification of the principals of the invention, and is not intended to limit the invention to that as illustrated.

FIG. 1 provides a perspective view of a ground material discharge chute 10 attached to a coffee grinder 12. Typically, the coffee grinder 12 has a generally vertically oriented body 14 having an upper body portion 16 and a lower body portion 18. The upper body portion 16 has a hopper fill opening 20 formed in the top thereof covered by a top cover 22. Coffee beans or other material to be ground are disposed in the hopper fill opening 20 and are ground by a grinding mechanism 24 and discharged from the coffee grinder 12 through a discharge opening 26 (as better shown in FIG. 3). Many coffee grinders 12 are provided with grinder controls 28 positioned on the front thereof to select a desired degree of grinding.

The upper body portion 16 of the coffee grinder 12 has a grinder discharge overhang area 30 extending away from the lower body portion 18. It is through a downwardly facing surface 32 of the grinder discharge overhang 30 to which the chute means 10 is attached.

FIGS. 2 through 6 provide enlarged front, side, top and operational views of the chute 10. As shown in the side view of FIG. 3 with reference to FIG. 2, the chute 10 is formed with an upper chute body 34 and a lower chute body 36. A hinged cover 38 is attached to the upper chute body 34 and hangs generally forwardly of the lower chute body 36. Generally, the chute 10 is a vertically elongate channel-shaped structure which attaches directly underneath the overhang area 32 in communication with the discharge opening 26. The upper portion 34 is generally tubular in that four sides direct ground material such as coffee discharged therethrough vertically downward through the chute 10. The lower chute portion 36 is generally channel-shaped with two sides 40 extending generally perpendicularly away from a back portion 42.

The ground material directing cover means or hinged cover 38 is operatively attached to the upper chute 34 to cover the open side of the lower chute 36 for retainably downwardly directing ground coffee discharged from the upper chute portion 34. The hinged cover 38 is formed with two sides 44 which extend generally perpendicularly away from a front surface 46 of the hinged cover 38 towards the back portion 42 of the lower chute portion 36. In retaining ground coffee discharged through the chute, the sides 44 of the hinged cover 38 extend over the outside surface 48 of the lower chute portion 36.

Operative engagement of the hinge cover 38 to the upper chute portion 34 is achieved by using shafted screws 50 projecting through an aperture formed in a flange portion 52 and threadedly engaging a weld nut 54 attached to an inside surface of the upper chute portion 34. A shaft portion 56 of the screw 50 permits the hinged cover 38 to hingedly move with respect to the upper and lower chute portions 34, 36. By hingedly attaching the cover 38 of the chute 10, the cover 38 is capable of opening to accommodate increased ground coffee discharge flow through the chute 10 thereby providing an important discharge flow regulating function which aids in retaining the chaffe mixed in the ground coffee. Further, the cover 38 shields the ground coffee being discharged through the chute from ambient air currents which, if not for the cover, would tend to separate the chaffe being discharged with the ground coffee.

A free end 58 is formed on the end of the cover 38 distal most the discharge opening. As shown in FIG. 3, the free end is formed at an obtuse angle 60 greater than 90° yet less than 180° relative to the front surface 46 of the cover 38. By angling the free end 58 inwardly towards the lower chute 36, the responsiveness of the cover 38 is increased upon increased flow of ground coffee through the chute 10. Ground coffee flowing through the chute 10 impinges on a generally upwardly facing inside surface 62 of the free end 58 which tends to force the cover 38 away from the lower chute 36.

Additionally, the sides 44 of the cover 38 are formed with leading edges 64 which are angled upwardly towards the top of the chute 10. The angled leading edges 64 provide greater exit area when the cover 38 is forced away from the lower chute 36 through which ground coffee may pass to controllably increase the rate of flow of the ground coffee out of the chute 10.

Turning now to the upper portion 34 of the chute 10, a chaffe suppressing grinder discharge cleaning baffle means or baffle means 66 is shown. The baffle means 66 is attached to the inside of the upper chute 34 for suppressing chaffe separation as ground coffee is discharged through the discharge opening 26. The baffle means 66 includes a plate member 70 which hingedly biasedly attaches to the inside surface 68. A first side 72 of said plate member 70 faces the grinder discharge opening 26 and a second side 74 faces downwardly away from the grinder discharge opening 26. Ground coffee discharged through the grinder discharge opening 26 accumulates against the first side 72 until a predetermined amount of ground coffee has accumulated whereupon a torsion spring 76 is compressed and ground coffee flows downwardly off of the first side 72 of the plate member 70 through the upper chute 34 and lower chute 36.

Hinged attachment of the plate member 70 to the upper chute 34 is achieved by forming a shaft retaining portion 78 on the uppermost end of the plate member 70. The shaft retaining portion 78 is formed by curving an end of the plate member 70 to form a generally cylindrical structure through which a shaft 80 is inserted. The shaft 80 projects through apertures formed in the side of the upper chute 34 and is retained projecting therethrough by spring clips 82. As shown in FIG. 2, the shaft retaining portion 78 has two gaps 84 formed therethrough exposing a portion of the shaft 80. The torsion springs 76 are positioned in these gap areas 84 over the shaft 80 projecting therethrough to provide biasing of the plate member into a generally normally closed position.

As better shown in FIG. 3, a first leg 86 of the torsion spring 76 is retained against the second side 74 of the plate member 70. A second leg 88 of the torsion spring 76 is positioned against the inside surface 68 of the upper chute 34. A spring leg positioning plate 90 retains the second leg 88 in a generally vertical orientation by retaining the second leg 88 in a gap formed therein. As mentioned above, the torsion spring 76 is selected to retain the plate member 70 in a discharge opening obstructing position (i.e., generally "closed") and is overcome by a predetermined amount of ground coffee which accumulates on the first side 72 of the plate member 70. The predetermined amount of coffee allowed to accumulate on the first side 72 is an amount which will prevent separation of chaffe from the ground coffee yet will not accumulate to the extent of clogging the discharge opening 26.

Regardless of the design and operation of the plate member 70 and biasing means 76, the characteristics of ground coffee tend to cause some caking in the discharge opening 26 requiring manual removal or cleaning therefrom. In order to provide manual cleaning of the discharge opening 26, a plunger member 94 is attached to the first side 72 of the plate member 70 and is formed to project upwardly into the discharge opening 26 to "sweep" through the discharge opening upon movement of the plate member 70. As shown in FIG. 4, the plunger 94 has a generally "L-shaped" configuration to release any accumulated coffee grounds, yet not interfere with the discharge chute 26.

While the plunger 94 sweeps through the discharge opening 26 upon movement of the plate member 70, a manual clean out lever 96 is provided and attached to the second side 74 of the plate member 70. The manual clean out lever 96 projects through an opening 98 formed through the front cover 97 of the upper chute 34. As shown in FIG. 4, a handle portion 100 is formed on the outside end of the clean out lever 96 to permit a user to comfortably grasp the lever 96 while applying a manual force.

With reference to FIG. 6, manual clean out is accomplished by pulling upwardly on the manual clean out lever 96 is indicated by the arrow 102. Applying a force in the direction of the arrow 102 sufficient to overcome the biasing force of the torsion spring 76 permits the plunger 94 to pass through a path of travel as indicated by arrow 104. Retaining the plate member 70 and attached plunger 94 in this position provides a unobstructed opening from the discharge opening 26 to the upper chute 34.

In use, coffee is ground in the coffee grinder 12 and discharged through a discharge opening 26. The chute 10, mounted over the discharge opening 26, is formed with a chute discharge opening 106 in communication with the discharge opening 26. Ground coffee passing through the discharge opening 26 and the chute discharge opening 106 accumulates on the first side 72 of the plate member 70. Upon accumulation of a predetermined amount of ground coffee, the torsion spring 76 is compressed by the weight of the coffee on the plate member 70 whereupon the plate member 70 moves downwardly towards the inside surface 68 of the front cover 97 of the upper chute 34. Movement of the plate member 70 permits ground coffee to flow downwardly through the upper chute 34 and lower chute 36.

As the plate member 70 moves, the plunger 94 travels along a path 104 through the discharge opening 26 to dislodge accumulations of ground coffee. The plate member 70 and torsion spring 76 return to the closed position upon the cessation of ground coffee discharge.

While ground coffee is flowing through the upper chute 34, the hinge cover 38 is appropriately urged away from the lower chute 36 by the ground coffee imposing forces thereupon. As shown in FIG. 5, ground coffee flowing past the plate member 70 accumulates in a container 108 which has been positioned over the lower chute 36 and the hinged cover 38. Forces imposed by ground coffee being discharged through the chute 10 on the upwardly facing inside surface 72 of the free end 58 force the hinged cover 38 away from the lower chute 36 to provide a larger opening through which ground coffee may flow.

Since the hinged cover 38 covers the ground coffee which accumulates in the container 108, chaffe is further retained within the ground coffee.

The baffle means 66 is manually operable from the outside of the chute 10 by urging the clean-out lever 96 upwardly as indicated by arrow 102. This action forces the plunger 94 through the discharge opening 26 even after ground coffee has ceased to be discharged.

While a preferred embodiment of the present invention is shown and described, it is envisioned that those skilled in the art may devise modifications of the present invention without departing from the spirit and scope of the appended claims.

The invention is claimed as follows:

1. A ground material discharge chute for use with a coffee grinder having a discharge opening therein, said chute being cooperatively positionable in communication with a discharge opening, said chute comprising: a generally vertical elongate channel-shaped chute body dimensioned for attachment in communication with a discharge opening in a grinder for receiving ground material therethrough, an upper portion of said chute body is generally tubular and a lower portion of said chute body having an open side; chaff suppressing grinder discharge cleaning baffle means operatively attached generally in said upper portion of said chute body for suppressing chaff separation from ground material discharged therethrough and for cleaning a discharge opening in a grinder over which said chute means is attached; ground material directing cover means operatively attached to said chute body generally covering at least a portion of said open side of said lower portion of said chute body for retainable directing ground material discharged from said upper portion of said chute body.

2. A ground material discharge chute according to claim 1 wherein said chaff suppressing grinder discharge cleaning baffle means includes a plate member hingedly attached inside of said upper portion of said chute body and biasing means operatively attached to said plate member for controllable biasedly obstructing flow of ground material through said chute body for retaining said ground material to mix said chaff with said ground material discharged therethrough to prevent chaff from separating from ground material, said biasing means being attached to said plate member for retaining said plate member in a discharge opening obstructing position and being overcome by a predetermined amount of ground material to be retained in a discharge opening being less than an amount causing grinder clogging retention of ground material therein.

3. A ground material discharge chute according to claim 2 wherein said biasing means include at least one coiled tension spring operatively attached to said plate member, a first leg of said coiled tension spring being retained against an inside surface of said chute body and a second leg of said coiled tension spring being retained against an adjacent surface of said plate member for retainably compressing said tension spring therebetween, said tension spring normally retaining said plate member in a position for obstructing a discharge opening.

4. A ground material discharge chute according to claim 3 wherein said tension spring is formed with a prespecified spring constant being compressible upon the accumulation of a predetermined amount of ground material for retaining at least a predetermined amount of ground material in a discharge opening before being discharged through said chute body.

5. A ground material discharge chute according to claim 2 wherein said plate member, positioned in a discharge chute obstructing position, includes a first side facing a grinder discharge opening and a second side facing away from a grinder discharge opening, a plunger member attached to said first side of said plate member projecting into a grinder discharge opening and being cooperatively formed for operatively dislodging ground material accumulated therein.

6. A ground material discharge chute according to claim 2 wherein said plate member, in a discharge chute obstructing position, includes a first side facing a grinder discharge opening and a second side facing away from a grinder discharge opening, a manually operable clean-out lever being attached to said second side of said baffle means projecting through an appropriately positioned and dimensioned opening formed in said upper portion of said chute means for manually operating said plate member to dislodge ground material accumulations.

7. A ground material discharge chute according to claim 1 in which said ground material directing cover means is hingedly attached to said chute body and includes a generally channel-shaped cover body complimentarily covering at least a portion of said open side of said chute body, side portions of said generally channel-shaped cover body extending towards said chute body and cooperatively forming a tube shape with said elongate channel-shaped chute body, said cover body side portions confining ground material passing therethrough to a generally consistent flow path through said chute body.

8. A ground material discharge chute according to claim 7 in which said ground material directing cover means is hingedly attached to said chute body by hinge means for providing hinged movement of said cover means away from said chute body for increasing the size of the chute opening therebetween, said cover means having a free end against which ground material flowing out of said upper portion of said chute body exerts a force thereagainst forcing said cover means away from said chute body.

9. A ground material discharge chute according to claim 8 wherein a portion of said free end is formed at an angle less than 180° relative to a front surface of said cover means, said free end directed towards said chute body for increasing the responsiveness of said hinged cover means to the flow of ground material out of said upper portion of said chute body.

10. A ground material discharge chute according to claim 9 wherein said angle is 155°.

11. A ground, material discharge chute according to claim 9 wherein said cover means is formed with a front surface, side portions extending away from said front surface at an angle of approximately 90°, said front surface and said side portions having ends distal said upper body portion and a leading edge of said side portions towards said free end of said cover means being angled upwardly towards said upper portion of said chute body at an acute angle relative to said front portion of said cover means for providing greater exit area through which ground material may pass out of said chute body.

12. A ground material discharge chute according to claim 11 wherein said leading edge of said side portions of said cover means is formed at an angle of 45°.

13. A ground material discharge chute according to claim 7 wherein said chute body and said cover means are cooperatively formed and dimensioned for insertion into a container to prevent spillage of said ground material over sides of a container.

14. A ground coffee discharge chute in combination with a coffee grinder and container for receiving ground coffee discharged therefrom, a discharge opening formed on an underside of an overhanging portion of said grinder to which said chute is cooperatively attached, a container being positioned proximate to said chute for receiving ground coffee discharged through said grinder through said chute, said chute comprising: a generally vertical elongate channel-shaped body dimensioned for attachment to said grinder in communication with said discharge opening therein for receiving ground coffee therethrough, an upper portion of said chute body being generally tubular and a lower portion of said chute body having an open side; chaff suppressing grinder discharge cleaning baffle means operatively attached generally in said upper portion of said chute body for suppressing chaff separation from ground coffee discharged from said grinder and for cleaning said discharge opening in said grinder over which said chute means is attached; ground material directing cover means operatively attached to said chute body generally covering at least a portion of said open side of said chute body for retainably directing round coffee discharged from said upper portion of said chute body, said lower portion of said chute and said ground material directing cover means being disposable in a container for preventing separation of chaff from ground coffee, said ground material directing cover means being adjustably attached to said chute for accommodating a range of container sizes.

15. A ground coffee discharge chute for use with a coffee grinder having a discharge opening therein, said chute being cooperatively positioned over a discharge opening, said chute comprising: a generally vertical elongate channel-shaped chute body dimensioned for attachment to a grinder in communication with a discharge opening therein for receiving ground coffee therethrough, an upper portion of said chute body having a generally tubular shape and a lower portion of said chute body having an open side; chaff suppressing grinder discharge cleaning baffle means operatively attached generally in said upper portion of said chute body for suppressing chaff separation from ground coffee discharged therethrough and for cleaning a discharge opening in a grinder over which said chute means is attached, said baffle means being hingedly attached inside of said upper portion of said chute body and having a plate member with a lever member and a plunger member attached thereto, said lever member extending from said plate portion through an outwardly facing portion of said upper portion of said chute body for manually operating said plate member and said plunger member attached thereto, said plunger member extending from a side of said plate portion opposite said lever member into a discharge opening for disturbing accumulated ground coffee therein to prevent blockage thereof; ground coffee directing cover means operatively attached to said chute body generally covering at least a portion of said open side of said chute body for retainably directing ground coffee discharged from said upper portion of said chute body.

* * * * *

UNITED STATES PATENT AND TRADEMARK OFFICE
CERTIFICATE OF CORRECTION

PATENT NO. : 5,042,731

DATED : August 27, 1991

INVENTOR(S) : David F. Ford

It is certified that error appears in the above-identified patent and that said Letters Patent is hereby corrected as shown below:

Column 8, Line 63  " retainably directing round coffee"  it should read

-- retainably directing ground coffee --

Signed and Sealed this

Second Day of February, 1993

*Attest:*

STEPHEN G. KUNIN

*Attesting Officer*      Acting Commissioner of Patents and Trademarks